US010467104B1

(12) United States Patent
Samala et al.

(10) Patent No.: US 10,467,104 B1
(45) Date of Patent: Nov. 5, 2019

(54) METHOD AND SYSTEM FOR DISTRIBUTED SYSTEMS BACKUP CONFIGURATION WIZARD

(71) Applicant: EMC Corporation, Hopkinton, MA (US)

(72) Inventors: Sekhar Samala, Bangalore (IN); Anupam Chakraborty, Bangalore (IN); Upanshu Singhal, Bangalore (IN); Amarendra Behera, Bangalore (IN); Nikhil Ambastha, Bangalore (IN); Manjesh Chikkanayakanahally, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 254 days.

(21) Appl. No.: 13/630,632

(22) Filed: Sep. 28, 2012

(51) Int. Cl.
*G06F 11/14* (2006.01)

(52) U.S. Cl.
CPC ...... *G06F 11/1458* (2013.01); *G06F 11/1446* (2013.01); *G06F 11/1448* (2013.01); *G06F 11/1466* (2013.01); *G06F 2221/0782* (2013.01)

(58) Field of Classification Search
CPC .......................... G06F 11/1448; G06F 11/1466
USPC ........................................................ 707/204
See application file for complete search history.

(56) References Cited

U.S. PATENT DOCUMENTS

| 6,157,953 | A  | * | 12/2000 | Chang et al. ................. 709/225 |
| 6,330,570 | B1 | * | 12/2001 | Crighton |
| 7,831,562 | B1 | * | 11/2010 | DeVos ................ G06F 11/1458 707/640 |
| 8,140,791 | B1 | * | 3/2012 | Greene ............... G06F 11/1464 711/162 |
| 2006/0117309 | A1 | * | 6/2006 | Singhal et al. ............... 717/162 |
| 2008/0104145 | A1 | * | 5/2008 | Lipman .............. G06F 11/1456 |
| 2010/0070725 | A1 | * | 3/2010 | Prahlad et al. ............... 711/162 |
| 2010/0132022 | A1 | * | 5/2010 | Venkatasubramanian ................... G06F 3/0601 726/7 |

* cited by examiner

*Primary Examiner* — Chris Parry
*Assistant Examiner* — Caroline H Jahnige
(74) *Attorney, Agent, or Firm* — Dergosits & Noah LLP; Todd A. Noah

(57) ABSTRACT

A distributed systems backup configuration wizard is described. A computer executes a wizard. The wizard receives an identifier of a distributed setup for backup configuration via a user interface. The wizard identifies each system which comprises the distributed setup. The wizard retrieves information associated with each system for configuring backup of the distributed setup. The wizard outputs configuration options based on retrieved information via the user interface. The wizard configures backup of the distributed setup based on the retrieved information and user selected configuration options received via the user interface.

10 Claims, 3 Drawing Sheets

METHOD AND SYSTEM FOR DISTRIBUTED SYSTEMS BACKUP CONFIGURATION WIZARD

BACKGROUND

A distributed system consists of multiple autonomous computers, called nodes, which communicate through a computer network. Each computer has its own local memory, and communicates with the other computers by message passing. A distributed system may have a common goal, such as solving a large computational problem. Alternatively, each computer may have its own user with individual needs, such that the purpose of the distributed system is the coordinating of the use of shared resources or provisioning of communication services to the users. The distributed system may consist of different kinds of computers and network links, and the system may change during the execution of a distributed program. Therefore, the structure of the distributed system (network topology, network latency, number of computers) may not be known in advance. Each computer has only a limited, incomplete view of the system. There are many cases in which the use of a single computer would be possible in principle, but the use of a distributed system is beneficial for practical reasons. For example, obtaining a desired level of performance may be more cost-efficient through the use of a cluster of several low-end computers, in comparison to a single high-end computer. A distributed system can be more reliable than a non-distributed system because a distributed system has no single point of failure. Moreover, a distributed system may be easier to expand and manage than a monolithic uniprocessor system. A distributed system user may execute a backup application to create a backup for the distributed system and execute a restore application to restore the distributed system from a previous backup for the distributed system.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

The prior art process for a distributed system user to configure a backup for a distributed system requires a system administrator to log in to each system in the distributed system, identify the information for configuring the backup for each system in the distributed system, and use that information to configure the backup for each individual system. This prior art process is a tedious and time consuming task for the system administrator. Numerous chances exist for human errors, such as a system administrator not collecting all of the required information or collecting incorrect configuration information during this manual process. The debugging and/or the troubleshooting following this manual process that is prone to human errors is also a tedious and time consuming task.

The subject matter presented herein provides a distributed systems backup configuration wizard that offers solutions to prior art problems. A wizard is a type of user interface that presents a user with a sequence of dialog boxes that lead the user through a series of well-defined steps. The distributed systems backup configuration wizard configures the backup for all of the systems in distributed setup based on minimal inputs from a distributed system user. A distributed setup is a portion of a distributed system that a user selects for backup. The wizard receives an identifier of a distributed setup for backup configuration from a distributed system user, identifies each system in the identified distributed setup, and retrieves information for each identified system for configuring backup of the distributed setup. The wizard outputs configuration options based on the retrieved information to a distributed system user, and configures backup of the distributed setup based on retrieved information and user-selected configuration options. The wizard helps system administrators in configuring backup for distributed setups in less time and with fewer errors, thereby saving system administrators from trouble shooting backup configuration issues by reducing support requests and support calls resulting from backup configuration errors.

Figure 1:
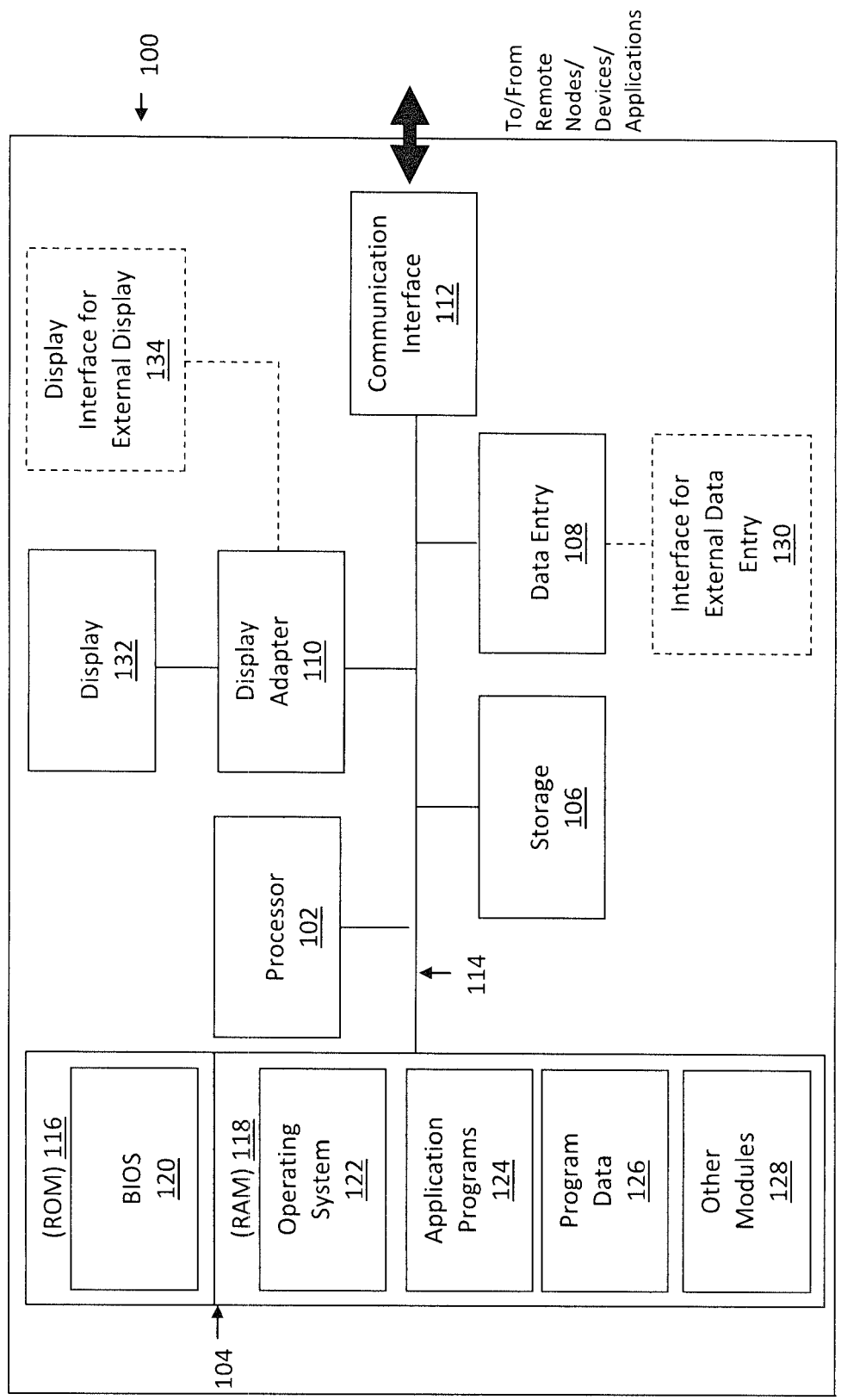
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for a distributed systems backup configuration wizard.

The prior art process for a distributed system user to configure a backup of a distributed system is a tedious and time consuming task for the system administrator. Numerous chances exist for human errors, such as a system administrator not collecting all of the required information or collecting incorrect configuration information during this manual process. The debugging and/or the troubleshooting following this manual process that is prone to human errors is also a tedious and time consuming task.

Embodiments herein offer solutions to prior art problems by providing a distributed systems backup configuration wizard. The distributed systems backup configuration wizard configures the backup for all of the systems in distributed setup based on minimal inputs from a distributed system user. The wizard helps system administrators in configuring backup for distributed setups in less time and with fewer errors, thereby saving system administrators from trouble shooting backup configuration issues by reducing support requests and support calls resulting from backup configuration errors.

Figure 2:
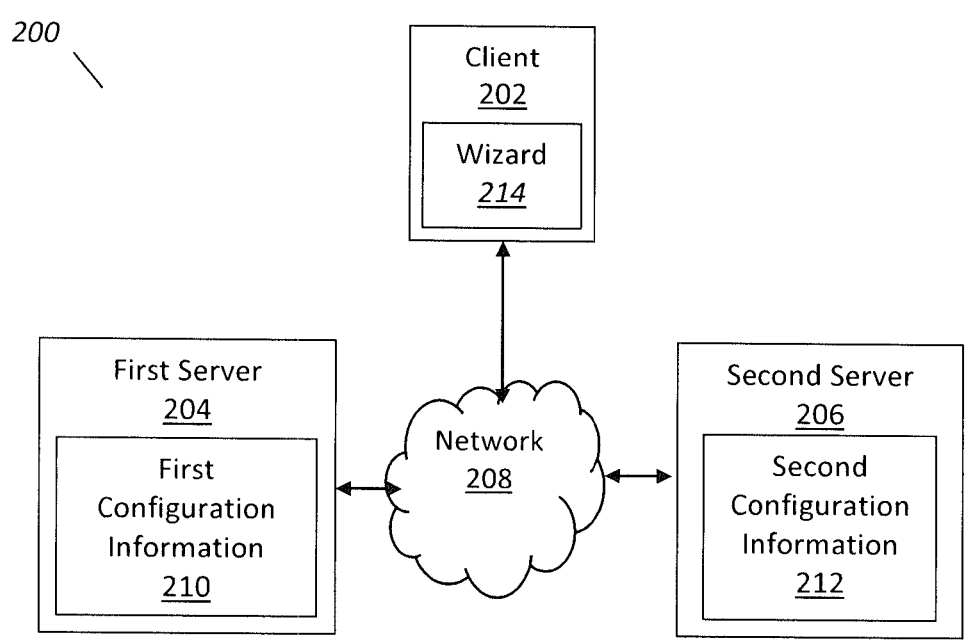
FIG. 2 illustrates a block diagram of an example system for a distributed systems backup configuration wizard, under an embodiment.

FIG. 2 illustrates a block diagram of a system that implements a distributed systems backup configuration wizard, under an embodiment. The wizard may be portable, such that it can configure backup in many different environments. The wizard is scalable, such that the wizard may configure backup for a distributed system of anywhere from two computers to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, a first server 204, and a second server 206 that are provided by a hosting company. The client 202 and the servers 204-206 communicate via a network 208. Although FIG. 2 depicts the system 200 with one client 202, two servers 204-206, and one network 208, the system 200 may include any number of clients 202, any number of servers 204-206, and any number of networks 208. Each of the client 202 and the servers 204-206 is substantially similar to the system 100 depicted in FIG. 1. The client 202 enables a user to communicate with the servers 204-206 in a distributed system, and configure backup of the servers 204-206 in the distributed system. The servers 204-206 may be part of a distributed system that is a Microsoft Sharepoint® Distributed Farm, a Microsoft Exchange® Database Availability Group (DAG), a high-availability cluster, or any other type of distributed system. The first server 204 includes first configuration information 210 that is used to configure the backup of the first server 204, and the second server 206 includes second configuration information 212 that is used to configure the backup of the second server 206. While FIG. 2 depicts a distributed systems backup configuration wizard 214 that is executed by the client 202 and as residing in the client 202, the wizard 214 may also reside partially or wholly in the servers 204-206, such that the client 202 accesses the wizard 214 via the servers 204-206 to execute the wizard 214.

The wizard 214 receives an identifier of a distributed setup for backup configuration from a distributed system user. For example, a distributed system user uses the client 202 to select the option to create a new client resource by entering the name "my_exchange_2007_client" via a user interface, and the wizard 214 receives the name "my_exchange_2007_client." The back of a distributed system may be referred to as a client resource. The identifier may specify a distributed setup name or a system name which is part of the distributed setup. For example, the user may specify a cluster name of distributed Microsoft Exchange® mailbox servers, or identify a specific Microsoft Exchange mailbox server in the distributed system of Microsoft Exchange® mailbox servers. The system 200 may include multiple wizards 214 to configure backup for specific types of distributed systems, such as one wizard 214 for configuring the backup of a Microsoft Sharepoint® Distributed Farm, and another wizard 214 for configuring the backup for a Microsoft Exchange® Database Availability Group (DAG).

If an application to be backed up is configured on a cluster, the wizard 214 may create client resources for passive node and/or active node, and also automatically create a client resource for a virtual server name. The wizard 214 will enable a distributed system user to create a new client resource and scheduled the new client resource for backup, as well as provide the capability to modify an existing client resource configuration.

The wizard 214 also provides selections of configuration types to a distributed system user. For example, the wizard 214 provides selections of configuration types to the client 202 that lists the configuration types that a distributed system user may select, such as "client" to configure a backup using the client host software (for use with file systems and modules), "proxy host" to configure a proxy host for backup of virtual machines, and "cluster" to configure backup for the physical nodes and resource groups of a cluster.

The wizard 214 identifies each system in the identified distributed setup. For example, the wizard 214 identifies the first server 204 and the second server 206 as participating nodes in a distributed system cluster and automatically creates the client resources.

The wizard 214 retrieves information for each identified system for configuring backup of the identified distributed setup. For example, the wizard 214 retrieves the first configuration information 210 for the first server 204 in background and retrieves the second configuration information 212 for the second server 206 in background. Retrieving information associated with each system may require connecting to each system in the distributed setup or connecting to one system in the distributed setup. For example, the wizard 214 may retrieve information from each Microsoft Exchange® mailbox server in a distributed system of Microsoft Exchange® mailbox servers. In another example, the wizard 214 may retrieve the information for a specific Microsoft Exchange® mailbox server in the distributed system of Microsoft Exchange® mailbox servers, either because the active directory for the specific Microsoft Exchange® mailbox server stores the configuration information for each Microsoft Exchange® mailbox server in the distributed system of Microsoft Exchange® mailbox servers or because the user wants to configure the backup only for the specific Microsoft Exchange® mailbox server.

Retrieving information associated with each system may include verifying that each system is executing expected system components. For example, the wizard 214 verifies that each system component expected to be executed by the servers 204-206 is available and executing. Retrieving information associated with each system may include accessing at least one system in the distributed setup via the credentials and/or authentication information used by a backup application. For example, the wizard 214 uses the same credentials and authentication information to access the servers 204-206 that will be used by the backup application to access the distributed system when the backup configuration is completed. The verification of each system executing expected system components and the use of the same credentials and/or authentication information to access a distributed system that will be used by the backup application to access the distributed system may result in a significant reduction of trouble shooting backup configuration issues for system administrators by reducing support requests and support calls resulting from backup configuration errors.

The wizard 214 outputs configuration options to the client 202 that a distributed system user may select, such as specifying the types of backups, based on the retrieved information. For example, the user may select backup types such as file system, Exchange server, Sharepoint server, and SQL server. The configuration options may include information about the distributed setup and/or information about each system in the distributed setup. For example, the wizard 214 may output configuration options for a distributed system of Microsoft Exchange® mailbox servers, or output configuration options for a specific Microsoft Exchange mailbox server in the distributed system of Microsoft Exchange® mailbox servers.

The wizard 214 outputs configuration options to the client 202 that a distributed system user may select, such the objects to be backed up. The wizard 214 displays the list of available storage group or databases for which backup can be saved in the form of save sets. By default, the entire contents of each system in the distributed setup will be backed up. The user has the option to leave objects such as individual web applications and individual search components "marked" as included for backup, and the option to "unmark" such objects as excluded from backup. The wizard 214 provides configuration options for some distributed systems that enable the user to select passive node and active node backup respectively, and enable the user to either manually enter the name of a data mover or select the name of a data mover from a list. The wizard 214 provides configuration options for a database consistency check, and provides a default configuration option (which may be individually deselected) to backup system components which are required for disaster recovery. The wizard 214 provides configuration options for database backup, such as to perform active backup, to perform passive backup, or to perform active and passive backup. The wizard 214 provides configuration options for the user to select the storage node, the de-duplication parameter, a browse policy (the number of days to maintain backup entries in an online file index), a retention policy (the number of days to maintain backup entries in a save set index), and a schedule selection (the time to start a backup). The wizard 214 provides configuration options for save groups, but only save groups with valid snapshot policies are available for selection. The user has the option to add to an existing save group, or to create a new save group. The wizard 214 provides configuration options for the user to configure the SnapShot Management policy, such that the user either can select a SnapShot policy from an existing policy or can create a new SnapShot policy.

The wizard 214 configures backup of the distributed setup based on user-selected configuration options. For example, the wizard 214 configures backup for the user-selected name "my_exchange_2007_client" based on user-selected configuration options and configuration information, such as application specific save sets, backup commands, application information parameters, backup options, and command line options. The wizard 214 may display this configuration information and/or the user-selected configuration options via the client 202.

The distributed systems backup configuration wizard 214 configures the backup for all of the systems in distributed setup based on minimal inputs from a distributed system user. The wizard 214 helps system administrators in configuring backup for distributed setups in less time and with fewer errors, saving system administrators from trouble shooting backup configuration issues by reducing support requests and support calls resulting from backup configuration errors.

Figure 3:
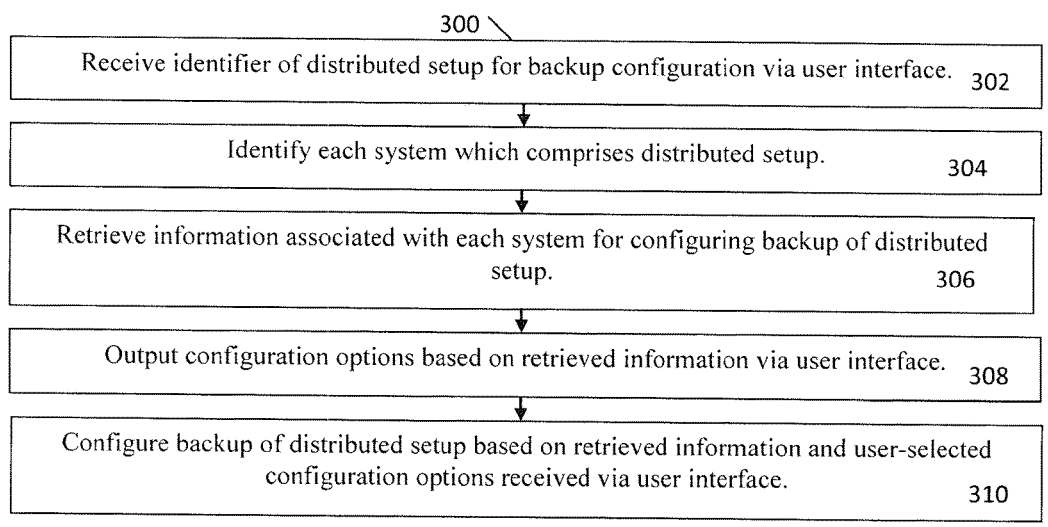
FIG. 3 is a flowchart that illustrates a method of a distributed systems backup configuration wizard, under an embodiment.

FIG. 3 is a flowchart that illustrates a method of a distributed systems backup configuration wizard. Flowchart 300 illustrates method acts illustrated as flowchart blocks for certain steps involved in and between the client 202 and the servers 204-206 of FIG. 2.

An identifier of a distributed setup for backup configuration is received via a user interface, act 302. For example, a distributed system user uses the client 202 to select the option to create a new client resource by entering the name "my_exchange_2007_client" via a user interface, and the wizard 214 receives the name "my_exchange_2007_client."

Each system which comprises the distributed setup is identified, act 304. For example, the wizard 214 identifies the first server 204 and the second server 206 as participating nodes in a distributed system cluster and automatically creates the client resources.

Information associated with each system for configuring backup of a distributed setup is retrieved, act 306. For example, the wizard 214 retrieves the first configuration information 210 for the first server 204 in background and retrieves the second configuration information 212 for the second server 206 in background.

Configuration options based on retrieved information is output via a user interface, act 308. For example, The wizard 214 provides configuration options via the client 202 for the user to select the storage node, the de-duplication parameter, the browse policy, the retention policy, and the schedule selection.

Backup of a distributed setup is configured based on retrieved information and user selected configuration options received via a user interface, act 310. For example, the wizard 214 configures backup for the user-selected name "my_exchange_2007_client" based on user selected configuration options and configuration information, such as application specific save sets, backup commands, application information parameters, backup options, and command line options.

Although FIG. 3 depicts the acts 302-310 occurring in a specific order, the acts 302-310 may occur in another order. The distributed systems backup configuration wizard described herein configures the backup for all of the systems in a distributed setup based on minimal inputs from a distributed system user. The wizard helps system administrators in configuring backup for distributed setups in less time and with fewer errors, saving system administrators from trouble shooting backup configuration issues by reducing support requests and support calls resulting from backup configuration errors.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system comprising:
   one or more processors; and
   a non-transitory computer readable medium storing a plurality of instructions, which when executed, cause the one or more processors to:
   receive an identifier of a distributed setup for backup configuration, the distributed setup including a cluster of nodes selected by a user for backup;
   provide, to a user interface, an option for the user to select a type of backup configuration for the distributed setup from a predefined list of backup configuration types, the predefined list including a cluster backup configuration type to perform a backup for the physical nodes and resource groups of a cluster, a client backup configuration type to perform a backup using host software on a client, and a proxy host backup configuration type to perform a backup for virtual machines;
   identify, in response to a selection of the cluster backup configuration type, a first server as a first node and a second server as a second node of the cluster of nodes included in the distributed setup identified by the identifier;
   retrieve backup configuration information for each of the first server and the second server identified by accessing at least one of the first server and the second server using credentials or authentication information also used by a backup application to access the at least one of the first server and the second server when the backup configuration of the distributed setup is completed;
   verify the first server and the second server are executing a distributed database component based on the retrieved backup configuration information, the distributed database component including an active database executing on the first server and a passive database executing on the second server;
   provide, to the user interface, configuration options to backup components of the distributed setup based on the retrieved backup configuration information, the configuration options including options specific to the verified distributed database component and including an option to backup one of active databases, passive databases, and both active and passive databases; and
   configure the backup of the distributed setup based on the retrieved backup configuration information and the configuration options selected via the user interface, the backup configured to backup only the active database on the first server if the option to backup active databases is selected, backup only the passive database on the second server if the option to backup passive databases is selected, and backup both the active database on the first server and the passive database on the second server if the option to backup both active and passive databases is selected.

2. The system of claim 1, wherein the first server includes a mailbox server operating as an active node within the cluster of nodes, and wherein retrieving the backup configuration information includes retrieving the backup configuration information from an active directory of the mailbox server.

3. The system of claim 1, wherein the configuration options further include an option to select a third server of the cluster of nodes to store the backup of the distributed setup.

4. The system of claim 1, wherein the configuration options further comprise at least one of information about the distributed setup and information about each system which comprises the distributed setup.

5. The system of claim 1, wherein the user interface is a client computer.

6. A computer-implemented method for a distributed systems backup configuration wizard, the method comprising:

receiving an identifier of a distributed setup for backup configuration, the distributed setup including a cluster of nodes selected by a user for backup;

providing, to a user interface, an option for the user to select a type of backup configuration for the distributed setup from a predefined list of backup configuration types, the predefined list including at least a cluster backup configuration type to perform a backup for the physical nodes and resource groups of a cluster, a client backup configuration type to perform a backup using host software on a client, and a proxy host backup configuration type to perform a backup for virtual machines;

identifying, in response to a selection of the cluster backup configuration type, a first server as a first node and a second server as a second node of the cluster of nodes included in the distributed setup identified by the identifier;

retrieving backup configuration information for each of the first server and the second server identified by accessing at least one of the first server and the second server using credentials or authentication information also used by a backup application to access the at least one of the first server and the second server when the backup configuration of the distributed setup is completed;

verifying the first server and the second server are executing a distributed database component based on the retrieved backup configuration information, the distributed database component including an active database executing on the first server and a passive database executing on the second server;

providing, to the user interface, configuration options to backup components of the distributed setup based on the retrieved backup configuration information, the configuration options including options specific to the verified distributed database component and including an option to backup one of active databases, passive databases, and both active and passive databases; and configuring the backup of the distributed setup based on the retrieved backup configuration information and the configuration options selected via the user interface, the backup configured to backup only the active database on the first server if the option to backup active databases is selected, backup only the passive database on the second server if the option to backup passive databases is selected, and backup both the active database on the first server and the passive database on the second server if the option to backup both active and passive databases is selected.

7. The method of claim 6, wherein the configuration options further comprise at least one of information about the distributed setup and information about each system which comprises the distributed setup.

8. The method of claim 6, wherein the user interface is a client computer.

9. A computer program product, comprising a non-transitory computer-readable medium having a computer-readable program code embodied therein to be executed by one or more processors, the computer-readable program code including instructions to:

receive an identifier of a distributed setup for backup configuration, the distributed setup including a cluster of nodes selected by a user for backup;

provide, to a user interface, an option for the user to select a type of backup configuration for the distributed setup from a predefined list of backup configuration types, the predefined list including a cluster backup configuration type to perform a backup for the physical nodes and resource groups of a cluster, a client backup configuration type to perform a backup using host software on a client, and a proxy host backup configuration type to perform a backup for virtual machines;

identify, in response to a selection of the cluster backup configuration type, a first server as a first node and a second server as a second node of the cluster of nodes included in the distributed setup identified by the identifier;

retrieve backup configuration information for each of the first server and the second server identified by accessing at least one of the first server and the second server using credentials or authentication information also used by a backup application to access the at least one of the first server and the second server when the backup configuration of the distributed setup is completed;

verify the first server and the second server are executing a distributed database component based on the retrieved backup configuration information, the distributed database component including an active database executing on the first server and a passive database executing on the second server;

provide, to the user interface, configuration options to backup components of the distributed setup based on the retrieved backup configuration information, the configuration options including options specific to the verified distributed database component and including an option to backup one of active databases, passive databases, and both active and passive databases; and configure the backup of the distributed setup based on the retrieved backup configuration information and the configuration options selected via the user interface, the backup configured to backup only the active database on the first server if the option to backup active databases is selected, backup only the passive database on the second server if the option to backup passive databases is selected, and backup both the active database on the first server and the passive database on the second server if the option to backup both active and passive databases is selected.

10. The computer program product of claim 9, wherein the configuration options further comprise at least one of information about the distributed setup and information about each system which comprises the distributed setup.

* * * * *